(12) United States Patent
Tamura et al.

(10) Patent No.: US 12,196,302 B2
(45) Date of Patent: Jan. 14, 2025

(54) GEAR DEVICE

(71) Applicant: SUMITOMO HEAVY INDUSTRIES, LTD., Tokyo (JP)

(72) Inventors: Mitsuhiro Tamura, Yokosuka (JP); Masahiro Watanabe, Yokosuka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/497,430

(22) Filed: Oct. 30, 2023

(65) Prior Publication Data
US 2024/0167554 A1    May 23, 2024

(30) Foreign Application Priority Data

Nov. 17, 2022   (JP) ................... 2022-184087

(51) Int. Cl.
*F16H 49/00* (2006.01)
*F16H 55/06* (2006.01)

(52) U.S. Cl.
CPC ........... *F16H 49/001* (2013.01); *F16H 55/06* (2013.01)

(58) Field of Classification Search
CPC .............................. F16H 49/001; F16H 55/06
USPC ............................................................ 74/640
See application file for complete search history.

(56) References Cited

U.S. PATENT DOCUMENTS

| 11,085,509 | B2* | 8/2021 | Shirouzu ................. F16H 55/17 |
| 11,268,604 | B2* | 3/2022 | Tamura ..................... F16H 1/10 |
| 11,274,736 | B2 | 3/2022 | Tamura et al. | |
| 2002/0178861 | A1* | 12/2002 | Kobayashi ............ F16H 49/001 74/640 |
| 2018/0266533 | A1* | 9/2018 | Tamura ................. F16H 49/001 |
| 2019/0160654 | A1* | 5/2019 | Moritani .................. B25J 18/00 |
| 2020/0025277 | A1* | 1/2020 | Tamura ................... F16H 55/06 |
| 2020/0072318 | A1* | 3/2020 | Shirouzu ............. F16H 55/0833 |
| 2020/0325976 | A1* | 10/2020 | Tamura ................... F16H 55/06 |
| 2024/0167554 | A1* | 5/2024 | Tamura ................... F16H 55/06 |

FOREIGN PATENT DOCUMENTS

JP      2018-155313 A     10/2018

* cited by examiner

*Primary Examiner* — Ha Dinh Ho
(74) *Attorney, Agent, or Firm* — HEA Law PLLC

(57) ABSTRACT

A gear device includes a resin gear that is formed of a first resin material, and a connected member that is formed of a second resin material and that is connected to the resin gear, in which the first resin material is a fiber-reinforced resin obtained by filling a first base material resin with first reinforcement fibers, the second resin material is a fiber-reinforced resin obtained by filling a second base material resin with second reinforcement fibers, and a fiber content ratio of the second reinforcement fibers in the second resin material is higher than a fiber content ratio of the first reinforcement fibers in the first resin material.

14 Claims, 2 Drawing Sheets

GEAR DEVICE

CROSS-REFERENCE TO RELATED APPLICATIONS

This application claims priority to Japanese Patent Application No. 2022-184087, filed on Nov. 17, 2022, which is incorporated by reference herein in its entirety.

BACKGROUND

Technical Field

A certain embodiment of the present disclosure relates to a gear device.

Description of Related Art

Weight saving may be required depending on an application of a gear device. In order to meet this requirement, the related art discloses a gear device including a resin gear that is formed of a resin material, and a connected member (in the related art, a bearing housing) that is connected to the resin gear and that is formed of a resin material.

SUMMARY

A gear device according to an embodiment of the present disclosure is a gear device including a resin gear that is formed of a first resin material, and a connected member that is formed of a second resin material different from the first resin material and that is connected to the resin gear, in which the first resin material is obtained by filling a first base material resin with first reinforcement fibers, the second resin material is obtained by filling a second base material resin with second reinforcement fibers, and a fiber content ratio of the second reinforcement fibers in the second resin material is higher than a fiber content ratio of the first reinforcement fibers in the first resin material.

DETAILED DESCRIPTION

Figure 1:
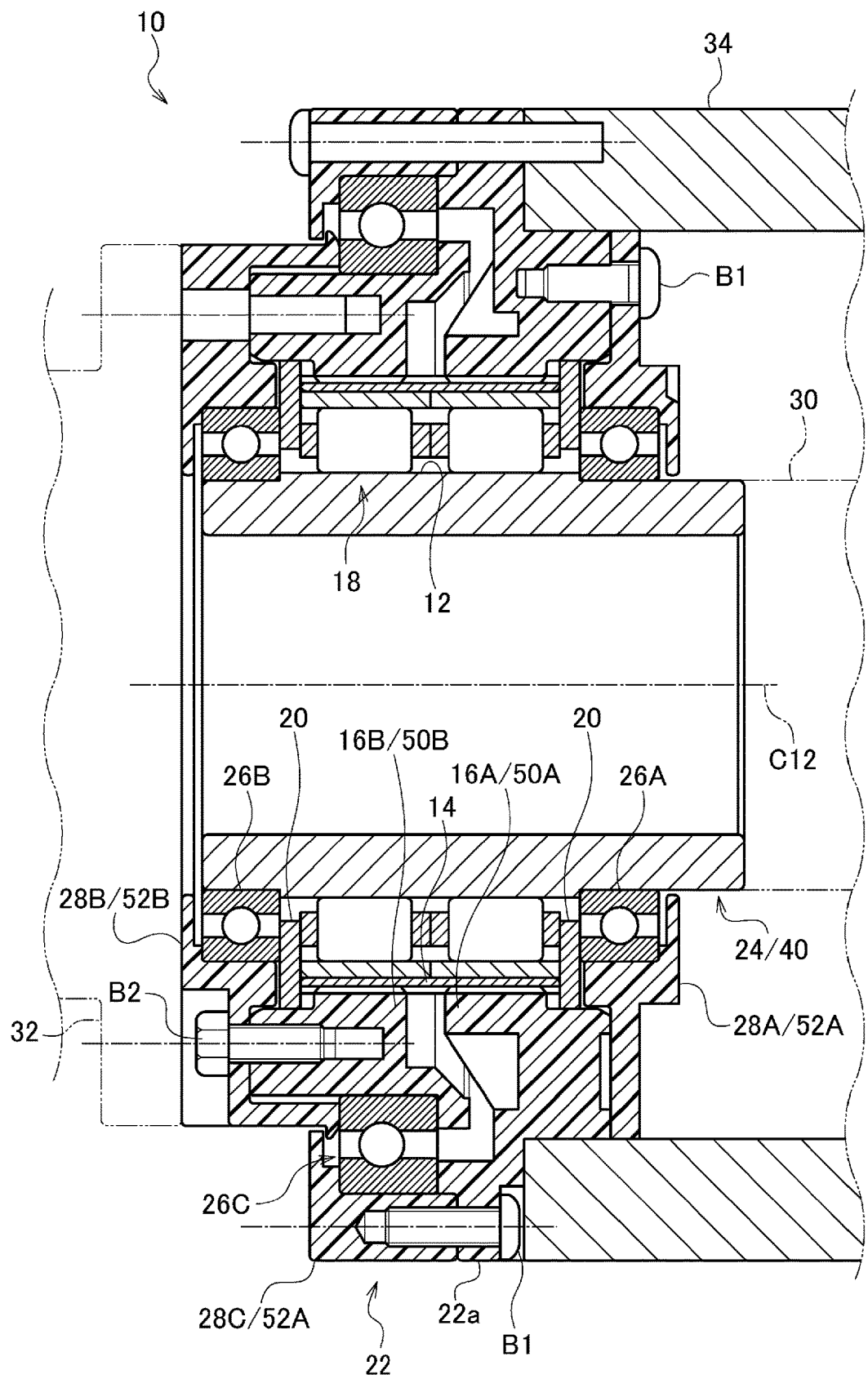
FIG. 1 is a side sectional view illustrating a gear device of an embodiment.

The inventors of the present application have found a new idea for suppressing an effect on durability of the resin gear while aiming a low cost of the resin gear.

It is desirable to provide a gear device that can suppress an effect on durability of a resin gear while aiming a low cost of the resin gear.

Hereinafter, an embodiment of the present disclosure will be described. The same components will be denoted by the same reference numerals, and duplicate description will be omitted. In each drawing, components are omitted, enlarged, or reduced, as appropriate, for convenience of description. The drawings are viewed in accordance with directions of the reference numerals.

First, a background of an idea of a gear device of the embodiment will be described. In the case of using a resin gear, stiffness of a resin part of the resin gear is decreased at a high temperature, and this causes a decrease in durability of the resin gear. As a measure to deal with this, the resin gear may be formed of a fiber-reinforced resin to secure the stiffness at a high temperature using reinforcement fibers. In the case of using the fiber-reinforced resin, the reinforcement fibers generally have a high cost. Thus, a low cost by reducing an amount of use of the reinforcement fibers is required. In order to implement this, in a case where both of the resin gear and the connected member are formed of the fiber-reinforced resin and where fiber content ratios (described later) of the reinforcement fibers of both of the resin gear and the connected member are simply decreased while having the same magnitude, a problem arises in that deterioration of the durability because of low stiffness at a high temperature is inevitable.

Here, a fiber content ratio Vf1 of first reinforcement fibers in the resin gear and a fiber content ratio Vf2 of second reinforcement fibers in the connected member are assumed. As a measure to deal with the above, the inventors of the present application have obtained a new idea that it is effective to set the fiber content ratio Vf1 of the resin gear to be lower than the fiber content ratio Vf2 of the connected member. Accordingly, it is possible to aim a low cost of the resin gear by reducing an amount of use of the first reinforcement fibers, compared to that in the case of setting the fiber content ratio Vf1 of the resin gear to be the same as the fiber content ratio Vf2 of the connected member. Particularly, the resin gear normally tends to have a higher component cost than other constituting members of the gear device. Aiming a low cost of the resin gear can efficiently decrease a cost of the entire gear device.

In addition, stiffness of the connected member at a high temperature can be secured, compared to that in the case of setting the fiber content ratio Vf2 of the connected member to be the same as the fiber content ratio Vf1 of the resin gear (in a case where both fiber content ratios are simply decreased while having the same magnitude). By connecting the resin gear to the connected member of which the stiffness at a high temperature is secured in such a manner, stiffness of the entire system in which the resin gear and the connected member are combined at a high temperature can be secured. Furthermore, even in a case where the amount of use of the first reinforcement fibers is reduced to aim a low cost of the resin gear, the effect on the durability can be suppressed by securing the stiffness at a high temperature via the entire system in which the resin gear and the connected member are combined. Hereinafter, the gear device of the embodiment conceived based on the above background will be described.

FIG. 1 will be referred to. The gear device 10 is incorporated in a driven machine as a part of the driven machine. The driven machine includes, for example, various machines such as an industrial machine (a machine tool, a construction machine, and the like), a robot (an industrial robot, a service robot, and the like), and a transport machine (a conveyor, a vehicle, and the like).

In the present embodiment, the bending meshing type gear device 10 of a tubular type will be illustratively described as the gear device 10. The gear device 10 includes a wave generator 12, a bending gear 14 that is bent and deformed by the wave generator 12, meshing gears 16A and 16B that mesh with the bending gear 14, a wave generator bearing 18 disposed between the wave generator 12 and the bending gear 14, and a regulating member 20 that regulates a movement of the bending gear 14 in an axial direction. In addition, the gear device 10 includes a casing 22, bearings 26A to 26C, and bearing housings 28A to 28C that support the bearings 26A to 26C. Hereinafter, for convenience of description, one side of the meshing gears 16A and 16B in the axial direction (a right side of the page of FIG. 1) will be referred to as an input side, and the other side in the axial direction (a left side of the page of FIG. 1) will be referred to as a counter-input side.

The gear device 10 includes an input member into which rotation is input from a drive source 30 (first external member) on the outside, an output member that outputs rotation to a driven member 32 (second external member) on the outside, and a fixing member fixed to a fixed member 34 (third external member) on the outside. Here, an example in which the input member is the wave generator shaft 24 including the wave generator 12, the output member is the bearing housing 28B, and the fixing member is the casing 22 will be described. The drive source 30 is, for example, a motor and may also be a gear motor, an engine, or the like. The driven member 32 and the fixed member 34 are, for example, a part of the driven machine. The output member is connected to the driven member 32 using a connection member (not illustrated) such as a bolt or a rivet. The fixing member is connected to the fixed member 34 using a connection member such as a bolt or a rivet.

Figure 2:
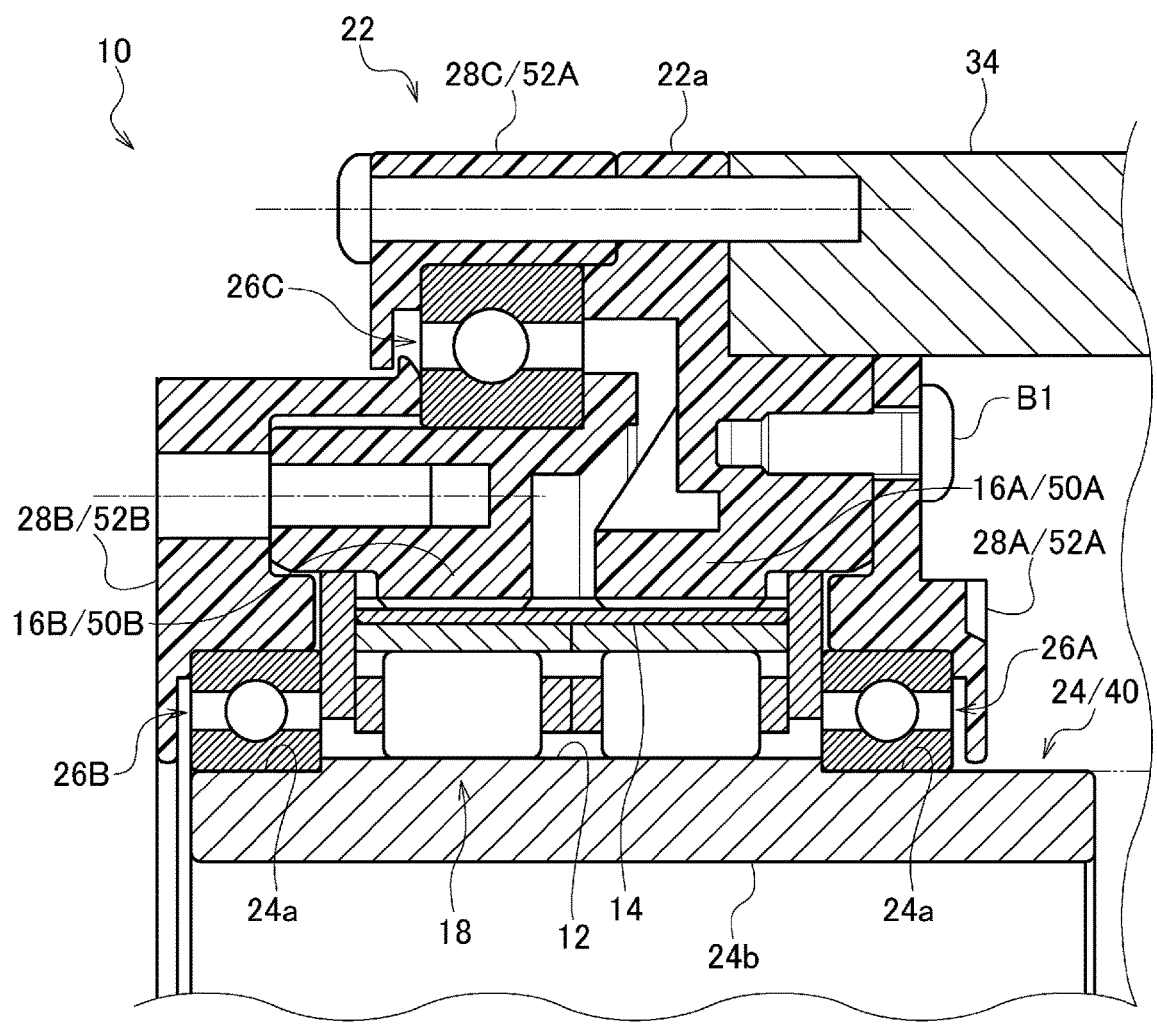
FIG. 2 is an enlarged view of FIG. 1.

FIG. 2 will be referred to. The wave generator 12 is a part of the wave generator shaft 24. The wave generator shaft 24 is an example of a rotary axis 40 that rotates when the gear device 10 operates. While an example in which the rotary axis 40 here is the input member into which rotation is input from the outside is illustrated, the rotary axis 40 may be the output member that outputs rotation to the outside. The wave generator shaft 24 includes, in addition to the wave generator 12, a shaft portion 24a provided on both sides of the wave generator 12 in the axial direction. A hollow portion 24b that passes through a center portion of the wave generator shaft 24 in the axial direction is formed in the center portion of the wave generator shaft 24. In a cross section of the wave generator 12 perpendicular to the axial direction, a shape of an outer periphery portion of the wave generator 12 is a shape of an ellipse, and a shape of an outer periphery portion of the shaft portion 24a is a shape of a circle. Here, "ellipse" is not limited to an ellipse in a geometrically strict sense and also includes an approximately elliptical shape.

The bending gear 14 is a tubular member having flexibility of being bent and deformed following rotation of the wave generator 12. One of the bending gear 14 or the meshing gears 16A and 16B is an external gear, and the other is an internal gear. Here, an example in which the bending gear 14 serves as an external gear and the meshing gears 16A and 16B serve as internal gears will be described.

The meshing gears 16A and 16B have stiffness to an extent of not being bent and deformed following rotation of the wave generator 12. The meshing gears 16A and 16B include the input side meshing gear 16A that is disposed on the input side, and the counter-input side meshing gear 16B that is disposed on the counter-input side. The input side meshing gear 16A meshes with teeth (external teeth) of an input side portion of the bending gear 14. The counter-input side meshing gear 16B meshes with teeth (internal teeth) of a counter-input side portion of the bending gear 14. The input side meshing gear 16A has the number of teeth (for example, 102) different from the number of teeth (for example, 100) of the bending gear 14, and the counter-input side meshing gear 16B has the number of internal teeth that is the same as the number of external teeth of the bending gear 14.

The casing 22 constitutes at least a part of an outer periphery portion of the gear device 10. The casing 22 of the present embodiment includes a casing member 22a that the input side meshing gear 16A doubles as, and the main bearing housing 28C that is connected to the casing member 22a. The casing member 22a that the input side meshing gear 16A doubles as is in contact with the fixed member 34.

The bearings 26A to 26C include the rotary bearings 26A and 26B that support the rotary axis 40, and the main bearing 26C that is disposed between the casing 22 and an inner side member (here, the counter-input side meshing gear 16B) disposed on a radial inner side of the casing 22. The rotary bearings 26A and 26B include the input side rotary bearing 26A that is disposed on the input side, and the counter-input side rotary bearing 26B that is disposed on the counter-input side. The rotary bearings 26A and 26B does not include a gear bearing (here, the wave generator bearing 18) that is disposed between a gear such as the bending gear 14 and the rotary axis 40. While an example in which the rotary bearings 26A and 26B are ball bearings is illustrated, specific examples of the rotary bearings 26A and 26B are not particularly limited and may be various bearings such as a roller bearing. While the main bearing 26C is illustrated as a ball bearing as an example, a specific example of the main bearing 26C is not particularly limited and may be various bearings such as a roller bearing, a crossed roller bearing, an angular ball bearing, a tapered bearing, and the like. The main bearing 26C is a bearing that supports the output member of the gear device 10, and is a bearing disposed between members having a lower relative rotation speed than a member in which the rotary bearings 26A and 26B are disposed.

The bearing housings 28A to 28C include the rotary bearing housings 28A and 28B that support the rotary bearings 26A and 26B, and the above main bearing housing 28C that supports the main bearing 26C. The rotary bearing housings 28A and 28B include the input side rotary bearing housing 28A that supports the input side rotary bearing 26A, and the counter-input side rotary bearing housing 28B that supports the counter-input side rotary bearing 26B. The rotary bearings 26A and 26B of the present embodiment are disposed between the shaft portion 24a of the wave generator shaft 24 constituting the rotary axis 40 and the rotary bearing housings 28A and 28B.

Operation of the gear device 10 of the present embodiment will be described. In a case where the wave generator 12 rotates, the bending gear 14 is bent and deformed in an elliptical shape corresponding to a shape of the wave generator 12. In a case where the bending gear 14 is bent and deformed in such a manner, a meshing position between the bending gear 14 and the meshing gears 16A and 16B changes in a rotation direction of the wave generator 12. At this point, each time the meshing position between the bending gear 14 and the input side meshing gear 16A having different numbers of teeth makes a round trip, the meshing teeth gradually shift in the peripheral direction. Consequently, one of the bending gear 14 or the input side meshing gear 16A (in the present embodiment, the bending gear 14) rotates, and an axial rotation component of the bending gear 14 is acquired by the output member as the output rotation. In the present embodiment, the bending gear 14 and the counter-input side meshing gear 16B synchronize with each other because of having the same number of teeth as each other, and the axial rotation component of the bending gear 14 is acquired by the counter-input side rotary bearing housing 28B as the output member through the counter-input side meshing gear 16B, which synchronizes with the bending gear 14. At this point, the output rotation that is changed in speed (here, decreased in speed) with a ratio of change corresponding to a difference in number of teeth between the bending gear 14 and the input side meshing gear 16A with respect to the input rotation input into the input member (wave generator 12) is acquired by the output member.

Here, the gear device 10 includes resin gears 50A and 50B and connected members 52A and 52B connected to the resin gears 50A and 50B. The resin gears 50A and 50B of the present embodiment include the first resin gear 50A that is the input side meshing gear 16A, and the second resin gear 50B that is the counter-input side meshing gear 16B. The connected members 52A and 52B of the present embodiment include a plurality of the first connected members 52A connected to the first resin gear 50A, and the second connected member 52B connected to the second resin gear 50B. In the present embodiment, the plurality of first connected members 52A are the input side rotary bearing housing 28A and the main bearing housing 28C, and the second connected member 52B is the counter-input side rotary bearing housing 28B.

The connected members 52A and 52B are connected to the resin gears 50A and 50B by connection members B1 and B2. While the connection members B1 and B2 of the present embodiment are bolts, specific examples of the connection members B1 and B2 are not particularly limited and may be various types of connection means rivets or the like. In the case of using a bolt, the resin gears 50A and 50B and the connected members 52A and 52B are fastened by the bolt. Each of the plurality of first connected members 52A is connected to the first resin gear 50A in common by the individual first connection member B1 (refer to FIG. 1 as well). The second connected member 52B is connected to the second resin gear 50B by the second connection member B2 (refer to FIG. 1).

The resin gears 50A and 50B are formed of a first resin material. The connected members 52A and 52B connected to the resin gears 50A and 50B are formed of a second resin material different from the first resin material of the resin gears 50A and 50B. The first connected member 52A is formed of the second resin material different from the first resin material of the first resin gear 50A, and the second connected member 52B is formed of the second resin material different from the first resin material of the second resin gear 50B. The first resin material is a fiber-reinforced resin obtained by filling a first base material resin with the first reinforcement fibers. The second resin material is a fiber-reinforced resin obtained by filling a second base material resin with the second reinforcement fibers. It is possible to aim high stiffness at a high temperature by filling with reinforcement fibers, while aiming weight saving by forming the resin gears 50A and 50B and the connected members 52A and 52B of a resin material.

In the present embodiment, the first base material resin and the second base material resin are made of different materials from each other. Specifically, the second base material resin has a lower glass transition point (Tg) than the first base material resin. The glass transition point (glass transition temperature) here is a temperature (° C.) that is an index of thermostability of a resin, and refers to a value that is a boundary between a glass state and a rubber state of a resin. The glass transition point is measured using, for example, differential scanning calorimetry complying with JIS K 7121.

Each of the first base material resin and the second base material resin may be formed of a resin selected from, for example, polyether ether ketone (PEEK; Tg: 143° ° C. to 160° C.), antiaromatic polyamide (Tg: 90° ° C. to 135° C.), polyamide 6 (PA6; Tg: approximately 50° C.), polyamide 66 (PA66; Tg: approximately 50° C.), polyethylene terephthalate (PET; Tg: approximately 70° C.), polyvinyl chloride (PVC; Tg: approximately 80° C.), polystyrene (PS; Tg: approximately 100° C.), polymethyl methacrylate (PMMA; Tg: approximately 70° C.), polyphenylene sulfide (PPS; Tg: approximately 88° C.), polyethylene (PE; Tg: −125° C.), polypropylene (PP; Tg: 0° C.), and polyacetal (POM; Tg: −50° C.). Here, a range of the glass transition point Tg that varies depending on a grade, a composition, and the like of a resin is illustrated. For example, the second base material resin is PPS, and the first base material resin is PEEK. The resin illustrated here is merely an example, and various types of resins may be employed as the first base material resin and the second base material resin as long as the second base material resin can be set to have a lower glass transition point than the first base material resin.

The first base material resin of the present embodiment has a higher Young's modulus (MPa) than the second base material resin. A Young's modulus (MPa) of a part of the above resins is, for example, PEEK: 3500 to 22300, PPS: 3300, PA6: 2600, PS: 2300 to 3300, PE: 1070 to 1090, and PP: 1100 to 1600.

The first reinforcement fibers and the second reinforcement fibers are made of different materials from each other. Specifically, the first reinforcement fibers have higher thermal conductivity (W/(m·K)) than the second reinforcement fibers. In implementing this, for example, the first reinforcement fibers are formed of carbon fibers or the like, and the second reinforcement fibers are formed of glass fibers, aramid fibers, polyethylene fibers, Zylon fibers, boron fibers, or the like. Thermal conductivity is, for example, 10 or higher in the case of carbon fibers, approximately 1 in the case of glass fibers, and approximately 0.1 to 1 in the case of aramid fibers.

The fiber content ratio Vf2 of the second reinforcement fibers in the second resin material is higher than the fiber content ratio Vf1 of the first reinforcement fibers in the first resin material. The fiber content ratio here refers to a ratio (vol %) of a volume of the reinforcement fibers to a total volume of the mentioned resin material. For example, a ratio of a volume of the first reinforcement fibers to a total volume of the first resin material is the fiber content ratio Vf1 of the first reinforcement fibers in the first resin material. The fiber content ratio, for example, may be defined using a combustion method complying with JIS K 7075. The fiber content ratio Vf2 is higher than the fiber content ratio Vf1 by, for example, 10% or higher. A magnitude relationship between the fiber content ratio Vf1 and Vf2 described here need only be satisfied between the resin gears 50A and 50B and the connected members 52A and 52B that are connected to each other, and does not need to be satisfied between members that are not connected to each other. For example, the magnitude relationship between the fiber content ratios Vf1 and Vf2 described here need only be satisfied between the first resin gear 50A and the first connected member 52A that are connected to each other, and does not need to be satisfied between the first resin gear 50A and the second connected member 52B.

The resin gears 50A and 50B of the present embodiment are obtained by including carbon fibers as the first reinforcement fibers in PEEK as the first base material resin, and the fiber content ratio Vf1 is 30%. In addition, the connected members 52A and 52B are obtained by including glass fibers as the second reinforcement fibers in PPS as the second base material resin, and the fiber content ratio Vf2 is 60%. Here, the fiber content ratio Vf1 and the fiber content ratio Vf2 are appropriately selected on a condition that the fiber content ratio Vf2 is higher than the fiber content ratio Vf1 in accordance with a type of base material resin, a type of included reinforcement fibers, and intensity and durability required for an application of the gear device 10. The fiber content ratio Vf1 is preferably 10 to 40% and more preferably 20 to 30% to be applicable to a wider range of applications. In addition, the fiber content ratio Vf2 is preferably 40 to 70%, more preferably 50 to 70% to be applicable to a wider range of applications, and further preferably 50 to 60% considering manufacturability.

An effect of the above gear device 10 will be described. The fiber content ratio Vf2 of the connected members 52A and 52B is higher than the fiber content ratio Vf1 of the resin gears 50A and 50B. Thus, as described above, even in a case where the amount of use of the first reinforcement fibers is reduced to aim a low cost of the resin gears 50A and 50B, the effect on the durability can be suppressed by securing the stiffness at a high temperature via the entire system in which the resin gears 50A and 50B and the connected members 52A and 52B are combined.

The first reinforcement fibers have higher thermal conductivity than the second reinforcement fibers. Accordingly, thermal conduction through the first reinforcement fibers can be promoted, compared to that in the case of setting the thermal conductivity of the first reinforcement fibers to be lower than the thermal conductivity of the second reinforcement fibers. Accordingly, it is possible to increase thermal dissipation that is release of heat generated in a gear pair because of meshing between the gear pair (here, the resin gears 50A and 50B and the bending gear 14) including the resin gears 50A and 50B to the outside. By increasing thermal dissipation in such a manner, it is possible to decrease a temperature of the gear pair, suppress low stiffness of the resin gears 50A and 50B caused by a high temperature, and further suppress the effect on the durability of the resin gears 50A and 50B. At this point, the heat generated in the gear pair can be released to the outside by thermal conduction in an order of, for example, resin gears 50A and 50B→fixed member 34 (external member) or be released to the outside by thermal radiation to an external space around the resin gears 50A and 50B.

As the thermal conductivity of the first reinforcement fibers is increased, the reinforcement fibers are likely to have a further higher cost. According to the present embodiment, as described above, the fiber content ratio Vf2 of the connected members 52A and 52B is set to be higher than the fiber content ratio Vf1 of the resin gears 50A and 50B. Thus, it is possible to effectively reduce the amount of use of the first reinforcement fibers, which is likely to have a high cost, and to effectively aim a low cost of the resin gears 50A and 50B, compared to that in the case of setting the fiber content ratio Vf1 of the resin gears 50A and 50B to be the same as the fiber content ratio Vf2 of the connected members 52A and 52B.

The second base material resin has a lower glass transition point than the first base material resin. Thus, a wide selection of inexpensive materials usable in the second base material resin can be provided, compared to that in the case of setting the second base material resin to have a higher glass transition point than the first base material resin. Furthermore, a low cost of the gear device 10 can be aimed by selecting an inexpensive material. In addition, the idea of the present embodiment is to secure the stiffness at a high temperature via the entire system in which the resin gears 50A and 50B and the connected members 52A and 52B are combined. Thus, a low cost of the gear device 10 can be aimed by selecting an inexpensive material in the first base material resin. That is, PEEK that has a high glass transition point is normally used in the resin used in the resin gear considering durability. However, according to the present embodiment, an inexpensive resin having a lower glass transition point than PEEK, specifically, a glass transition point lower than 140 degrees, can be used as a base material resin used in the resin gears 50A and 50B.

The resin gears 50A and 50B and the connected members 52A and 52B are fastened by a bolt. Thus, stiffness of the entire system in which the resin gear 50A and 50B and the connected members 52A and 52B are combined can be further increased with fastening force of the bolt.

The fiber content ratio Vf2 of each of the first connected members 52A is higher than the fiber content ratio Vf1 of the first resin gear 50A to which the plurality of first connected members 52A are connected in common. Accordingly, it is possible to secure stiffness of each of the plurality of first connected members 52A at a high temperature, compared to that in the case of setting the fiber content ratio Vf2 of each of the plurality of first connected members 52A to be the same as the fiber content ratio Vf1 of the first resin gear 50A. Thus, it is possible to secure further high stiffness at a high temperature via the entire system in which the first resin gear 50A and the plurality of first connected members 52A are combined. Furthermore, even in a case where the amount of use of the first reinforcement fibers is reduced to aim a low cost of the first resin gear 50A, the effect on the durability can be further suppressed.

Each of the plurality of resin gears 50A and 50B may be formed of the first resin materials of which both of a composition and a fiber content ratio are the same, or may be formed of the first resin materials of which at least one of them is different. Each of the plurality of connected members 52A and 52B may be formed of the second resin materials of which both of a composition and a fiber content ratio are the same, or may be formed of the second resin materials of which at least one of them is different.

Materials of members other than the resin gears 50A and 50B and the connected members 52A and 52B are not particularly limited. Here, while an example in which the wave generator 12 (wave generator shaft 24), the bending gear 14, the wave generator bearing 18, the connection members B1 and B2, and the like are formed of metal materials using metal such as steel and aluminum has been illustrated, the wave generator 12 (wave generator shaft 24), the bending gear 14, the wave generator bearing 18, the connection members B1 and B2, and the like may be formed of resin materials. In the case of providing a configuration using metal materials, a configuration using metal as a main component need only be provided, and not only a configuration using only the metal but also a configuration using alloy (alloy steel, aluminum alloy, or the like) having the metal as a main component may be provided. In providing configurations using metal materials and resin materials, a main material need only be formed of the mentioned materials. A configuration using only the main material may be provided, or a configuration using a composite material (the fiber-reinforced resin or fiber-reinforced metal) of the main material (metal or a resin) and other materials may be provided.

Next, a modification example of each component described so far will be described.

A specific type of the gear device 10 is not particularly limited and, for example, may be various gear devices such as a simple planetary gear device, a perpendicular shaft gear device, a parallel shaft gear device, and an eccentric oscillating gear device. In the case of an eccentric oscillating gear device, any of a center crank type in which a crankshaft is disposed on a shaft line of an external gear or an internal gear, or a distributed type in which a plurality of crankshafts are disposed at positions offset from the shaft line may be used. In the case of a bending meshing type gear device, not only a tubular type but also a cup type, a silk hat type, and the like may be used.

The casing 22 may be used as the output member instead of the bearing housing 28B, and any of the bearing housings 28A and 28B may be used as the fixing member instead of the casing 22. An example in which the gear device 10 functions as a speed reducer using the rotary axis 40 as the input member has been described. Alternatively, the gear device 10 may function as a speed increaser using the rotary axis 40 as the output member. In this case, the casing 22, the bearing housings 28A and 28B, and the like need only be used as the input member.

While the resin gears 50A and 50B have been illustratively described as the meshing gears 16A and 16B (internal gears), specific examples of the resin gears 50A and 50B are not particularly limited. The resin gears 50A and 50B, for example, may be any of internal gears, external gears, spur gears, bevel gears, screw gears, or helical gears.

While the connected members 52A and 52B have been illustratively described as the bearing housings 28A to 28C, specific examples of the connected members 52A and 52B are not particularly limited. The connected members 52A and 52B may be, for example, covers or carriers that are disposed in the axial direction with respect to gears and do not support bearings. In a case where the connected members 52A and 52B are the bearing housings 28A to 28C, the bearing housings 28A to 28C may be only one of the rotary bearing housings 28A and 28B or the main bearing housing 28C or may be other bearing housings.

The first resin material and the second resin material need only have different fiber content ratios, and compositions and materials of the base material resin and the reinforcement fibers may be the same or different. For example, the first reinforcement fibers and the second reinforcement fibers may have the same composition and be made of the same material. In addition, the first base material resin and the second base material resin may have the same composition and be made of the same material. For example, the first reinforcement fibers and the second reinforcement fibers may be made of the same material, and the first base material resin and the second base material resin may be made of different materials. In addition, the first reinforcement fibers and the second reinforcement fibers may be made of different materials, and the first base material resin and the second base material resin may be made of the same material. The first reinforcement fibers may have lower thermal conductivity than the second reinforcement fibers. The second base material resin may have a higher glass transition point than the first base material resin.

The first base material resin may have a lower Young's modulus than the second base material resin. Accordingly, a wide selection of inexpensive materials usable in the first base material resin can be provided, compared to that in the case of setting a higher Young's modulus than the second base material resin. Furthermore, a further lower cost of the resin gears 50A and 50B that tend to have a high component cost can be aimed by selecting inexpensive materials. In implementing this, preferably, the first reinforcement fibers may be set to have a higher Young's modulus than the second reinforcement fibers to secure the stiffness of both of the resin gears 50A and 50B. A Young's modulus (GPa) of the reinforcement fibers is, for example, carbon fibers: 230 to 935, glass fibers: 72 to 75, and aramid fibers: 70 to 112.

The embodiment and the modification example described above are merely examples. A technical idea that is an abstract of the embodiment and the modification example should not be construed as being limited to the contents of the embodiment and the modification example. The contents of the embodiment and the modification example can be subjected to many design changes such as change, addition, and deletion of components. In the above embodiment, contents that can be subjected to such design changes are highlighted with the term "embodiment". However, design changes are also allowed for contents without the term.

It should be understood that the invention is not limited to the above-described embodiment, but may be modified into various forms on the basis of the spirit of the invention. Additionally, the modifications are included in the scope of the invention.

What is claimed is:

1. A gear device comprising:
   a resin gear that is formed of a first resin material; and
   a connected member that is formed of a second resin material and that is connected to the resin gear,
   wherein the first resin material is a fiber-reinforced resin obtained by filling a first base material resin with first reinforcement fibers,
   the second resin material is a fiber-reinforced resin obtained by filling a second base material resin with second reinforcement fibers, and
   a fiber content ratio of the second reinforcement fibers in the second resin material is higher than a fiber content ratio of the first reinforcement fibers in the first resin material.

2. The gear device according to claim 1, wherein the first reinforcement fibers have higher thermal conductivity than the second reinforcement fibers.

3. The gear device according to claim 1, wherein the first base material resin and the second base material resin are made of different materials from each other.

4. The gear device according to claim 3, wherein the second base material resin has a lower glass transition point than the first base material resin.

5. The gear device according to claim 3, wherein the first base material resin has a lower Young's modulus than the second base material resin.

6. The gear device according to claim 1, wherein the resin gear and the connected member are fastened with a bolt.

7. The gear device according to claim 1, wherein the connected member is a bearing housing that supports a bearing.

8. The gear device according to claim 7, wherein the bearing housing includes a rotary bearing housing that supports a rotary bearing, and a main bearing housing that supports a main bearing.

9. The gear device according to claim 8, wherein the rotary bearing includes an input side rotary bearing that is disposed on an input side, and a counter-input side rotary bearing that is disposed on a counter-input side.

10. The gear device according to claim 8, wherein the main bearing is disposed between members having a lower relative rotation speed than a member in which the rotary bearing is disposed, and the rotary bearing is disposed between a shaft portion of a wave generator shaft constituting a rotary axis and the rotary bearing housing.

11. The gear device according to claim 1,
    wherein the connected member includes a plurality of connected members commonly connected to the resin gear, and a fiber content ratio of the second reinforcement fibers in each of the plurality of connected members is higher than a fiber content ratio of the first reinforcement fibers in the resin gear to which the plurality of connected members are commonly connected.

12. The gear device according to claim 1, further comprising:
a wave generator;
a bending gear that is bent and deformed following rotation of the wave generator; and
a wave generator bearing that is disposed between the wave generator and the bending gear.

13. The gear device according to claim 12, wherein the bending gear meshes with the resin gear, the bending gear serves as an external gear, and the resin gear serves as an internal gear.

14. The gear device according to claim 13, wherein the resin gear includes an input side gear that is disposed on an input side and a counter-input side gear that is disposed on a counter-input side, the input side gear has a first number of teeth that is different from a second number of teeth of the bending gear, and the counter-input side gear has a third number of teeth that is the same as the second number of teeth of the bending gear.

* * * * *